(12) United States Patent
Huang et al.

(10) Patent No.: US 7,586,407 B2
(45) Date of Patent: Sep. 8, 2009

(54) NETWORK DEVICE PROVIDING MULTI-FUNCTION STATUS INDICATORS

(75) Inventors: Kung-Shiuh Huang, Orange, CA (US); Hsiu-Ling Lee, Arcadia, CA (US); Tekai Liu, Irvine, CA (US); Razmik Mampourian, West Covina, CA (US); Kim-Hui Ng, Irvine, CA (US); James K. Pan, San Jose, CA (US); Shuchuan Yao, Irvine, CA (US)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 11/494,863

(22) Filed: Jul. 28, 2006

(65) Prior Publication Data

US 2008/0030362 A1 Feb. 7, 2008

(51) Int. Cl.
G08B 21/00 (2006.01)
(52) U.S. Cl. .................. 340/540; 340/815.4; 340/693.1; 340/525
(58) Field of Classification Search .............. 340/815.4, 340/815.45, 517, 524, 525, 286.02, 693.1, 340/540; 439/489–490; 345/33, 44, 46
See application file for complete search history.

(56) References Cited

U.S. PATENT DOCUMENTS 6,067,619 A * 5/2000 Melvin et al. ............... 713/100
6,219,235 B1 * 4/2001 Diaz et al. .................. 361/695
6,243,020 B1 * 6/2001 Lam et al. ................. 340/815.4
6,795,040 B2 * 9/2004 Kanamori ...................... 345/7
6,844,823 B2 * 1/2005 Hooks et al. ........... 340/815.45

OTHER PUBLICATIONS

Catalyst 3750 Switch, Hardware Installation Guide, Apr. 2003.*
SRW2048 Product Data Sheet, Linksys®, 2005, pp. 1-2.
SRW22464 Product Data Sheet, Linksys®, 2005, pp. 1-2.
Catalyst 3750 Switch Hardware Installation Guide, Cisco Systems, Inc., 2003, pp. 2-1 to 2-18.

* cited by examiner

*Primary Examiner*—Daniel Previl
(74) *Attorney, Agent, or Firm*—Haynes and Boone, LLP

(57) ABSTRACT

Systems and methods are provided to facilitate the display of status information associated with a network device using a plurality of multi-function status indicators, such as light emitting diodes (LEDs). In one implementation, a network device includes a plurality of user-viewable status indicators adapted to display status information associated with the network device. The network device further includes a processor adapted to detect a plurality of event conditions at the network device. A logic circuit of the network device is adapted to determine first and second sets status information to be displayed by the status indicators. A control circuit of the network device is adapted to provide the status indicators with display states associated with the first and second sets of status information without requiring user interaction with the network device. The event conditions may be multiplexed to identify associations between the event conditions and the display states.

20 Claims, 5 Drawing Sheets

NETWORK DEVICE PROVIDING MULTI-FUNCTION STATUS INDICATORS

BACKGROUND

1. Field of the Invention

The present invention generally relates to networking and more particularly to the monitoring of networked systems.

2. Related Art

Modern computing systems often include various network devices to facilitate network-based communications. For example, network devices such as switches and routers may be interconnected with each other and various networks to support such communications.

Individual network devices may include display panels to provide status information that may be monitored by a user. Frequently, these display panels are implemented with light emitting diodes (LEDs) configured to display the status of particular parameters of the device or the network system. For example, a first set of LEDs may be provided to indicate the operational status of various ports of the network device, and a second set of LEDs may be provided to indicate various system-related information.

Frequently, such network devices are implemented in compact hardware enclosures having relatively small form factors which can facilitate convenient grouping of multiple devices. Unfortunately, such implementations typically provide only a relatively small front panel area where LED display panels may be located to facilitate convenient inspection of the status of various parameters indicated on the device. However, as networked computing systems increase in complexity, individual network devices may be required to display status information pertaining to increasing numbers of parameters corresponding to, for example, increased numbers of ports or system information.

One approach to addressing such complexity is to provide greater numbers of LEDs on display panels of network devices. Nevertheless, as the number of LEDs increases, display panel real estate can also become increasingly valuable. Indeed, because of the small form factor of many network devices, only a limited number of LEDs may ultimately be implemented on the display panel. Moreover, if the number and spatial density of LEDs provided on the display panel becomes too large, it may become difficult for users to discern the actual parameters displayed by the LEDs.

Another approach is to provide the network device with only a limited number of dedicated LEDs corresponding to the most important monitored functions. However, such an approach can limit the ability of users to conveniently monitor the status of other parameters not shown on the LED display panel.

Yet another approach is the use of LEDs providing user-selectable displays. For example, a network device may be provided with a user-operable button on its front panel to permit a user to select between various different parameters to be displayed by the LEDs. Unfortunately, because the particular status information displayed by such implementations depends on user selection, the actual information displayed by such devices may be sub-optimal. For example, a given LED display panel may be configured to display port status in response to a user's selection of a particular display operation. In such an implementation, however, the LED display panel may not indicate the existence of a serious system error unless the user manually attempts to access such a display. As a result, a user may not be informed of relevant status information without manually selecting a particular display.

In view of the foregoing, there is a need for an improved approach to the display of status information on display panels of network devices that overcomes the various deficiencies of prior approaches identified above. In particular, there is a need for an improved approach that, for example, can inform users of the status of a plurality of parameters without requiring user manipulation of the device.

BRIEF DESCRIPTION OF THE FIGURES

Like element numbers in different figures represent the same or similar elements.

DETAILED DESCRIPTION

Figure 1:
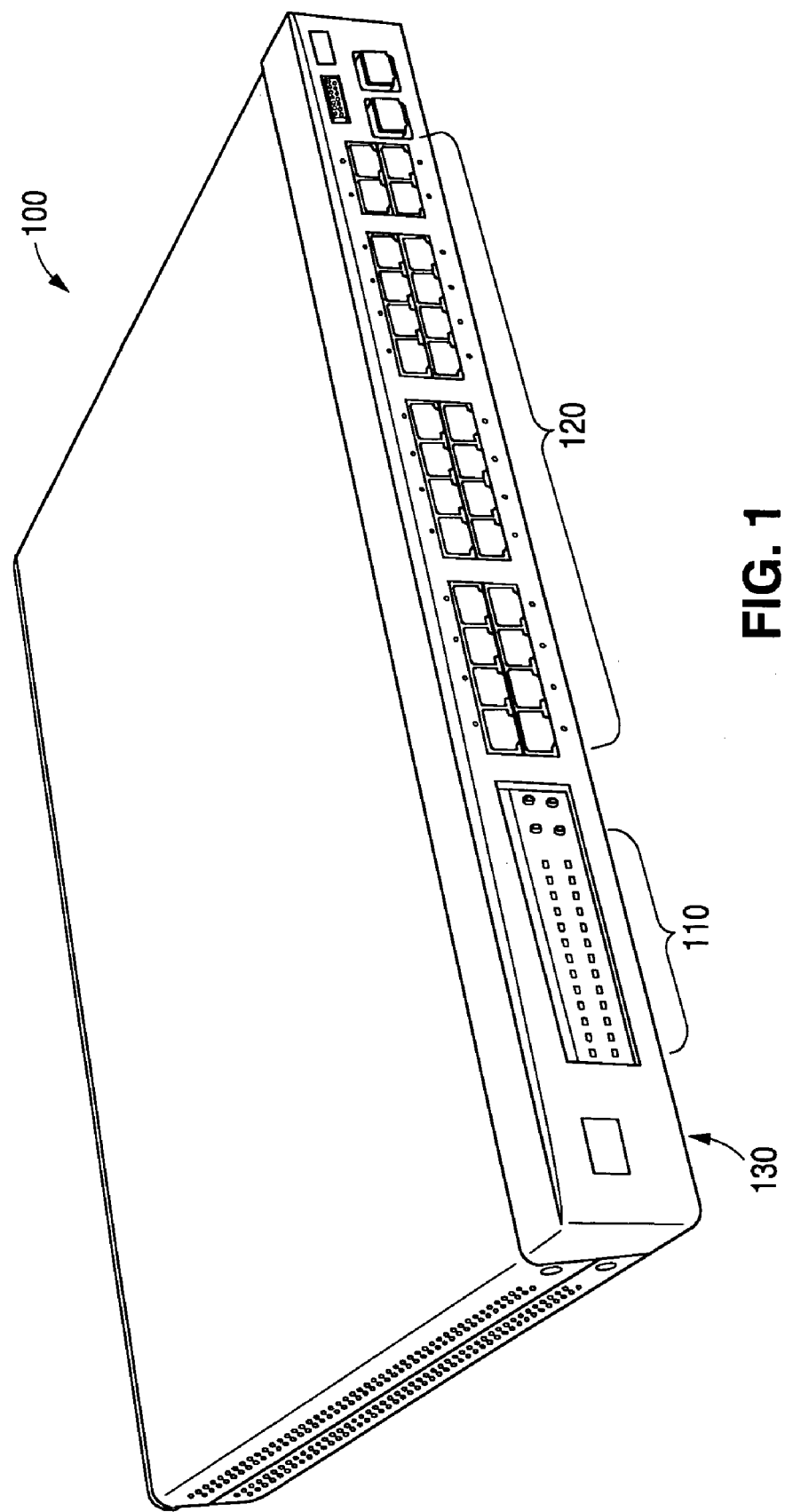
FIGS. 1 and 2 provide perspective views of network devices with status indicators in accordance with an embodiment of the present invention.
Figure 2:
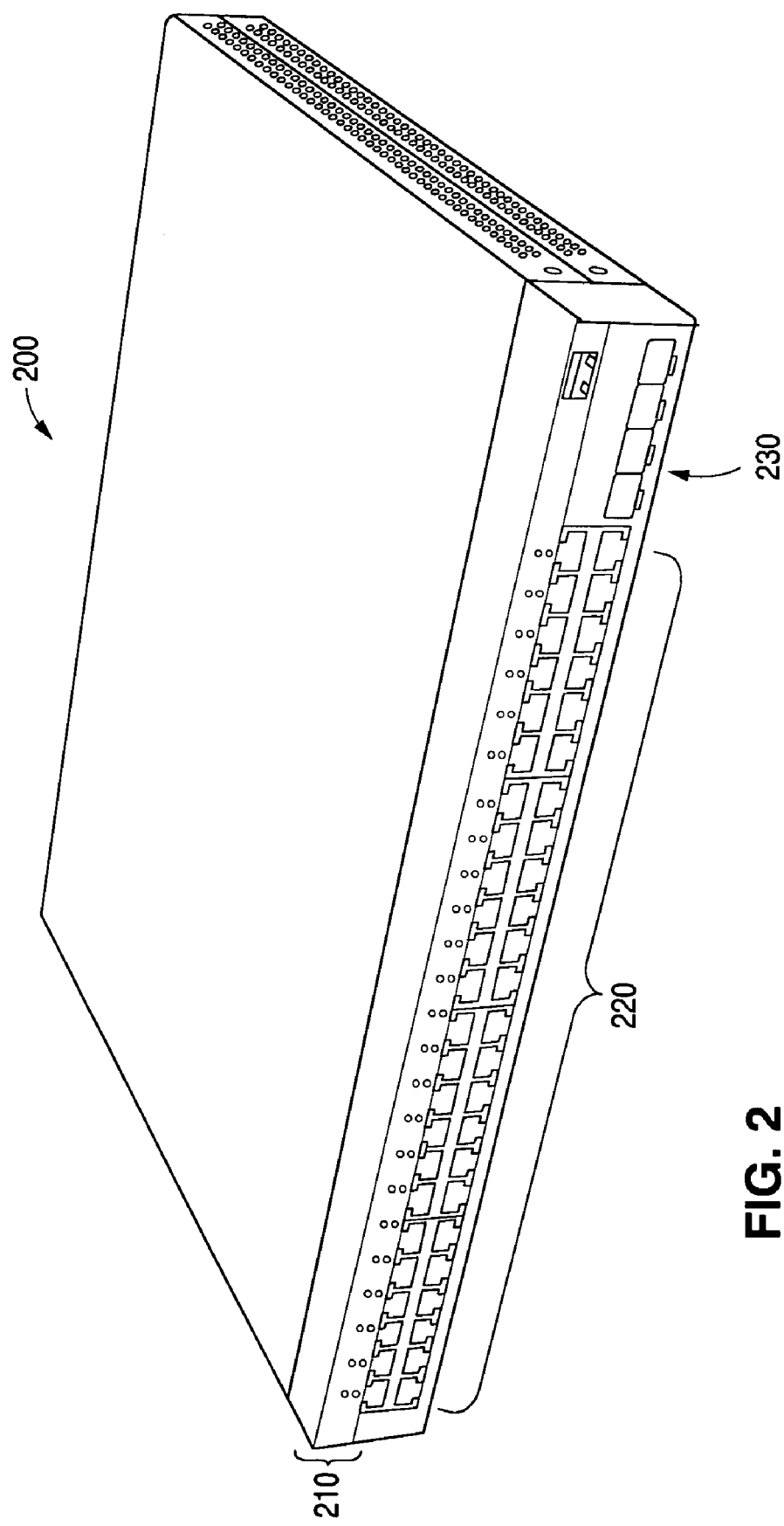

Referring now to the drawings wherein the showings are for purposes of illustrating embodiments of the present invention only, and not for purposes of limiting the same, FIGS. 1 and 2 provide perspective views of network devices 100 and 200 with status indicators in accordance with an embodiment of the present invention. As also shown in FIGS. 1 and 2, each of network devices 100 and 200 may be implemented with rack-mountable hardware to facilitate convenient stacking of one or more of each of network devices 100 and 200 in particular applications.

Referring to FIG. 1, network device 100 includes a plurality of status indicators implemented as light emitting diodes (LEDs) 110 visible from a front panel 130. Network device 100 further includes a plurality of ports 120 which may be implemented, for example, as Ethernet ports or other input/output ports known in the art.

Similarly, in FIG. 2, network device 200 includes a plurality of status indicators implemented as LEDs 210 visible from a front panel 230. Network device 200 further includes a plurality of ports 220 which may also be implemented, for example, as Ethernet ports or other input/output ports known in the art.

Upon inspection of FIGS. 1 and 2, it will be appreciated that LEDs 110 are mounted together on a left side of front panel 130 of network device 100, and LEDs 210 are mounted across a top portion of front panel 230 of network device 200. Although particular numbers of LEDs 110/210 and ports 120/220 are illustrated in the embodiments of FIGS. 1 and 2, it will be appreciated that network devices 100 and 200 may be provided with any desired numbers of such components.

As further described herein, LEDs 110 and 210 may be configured as multi-function LEDs which display different status information in response to event conditions detected by network devices 100 and 200 without requiring user interaction with network devices 100 and 200. For example, in various embodiments, LEDs 110 and 210 may display status information concerning ports 120/220, error conditions, identification of other network devices, and/or other status information associated with a network system depending on detected event conditions. It will be appreciated that although the display of status information is described herein with reference to various LEDs, any desired type of status indicators may be used in place of the LEDs disclosed herein.

Figure 3:
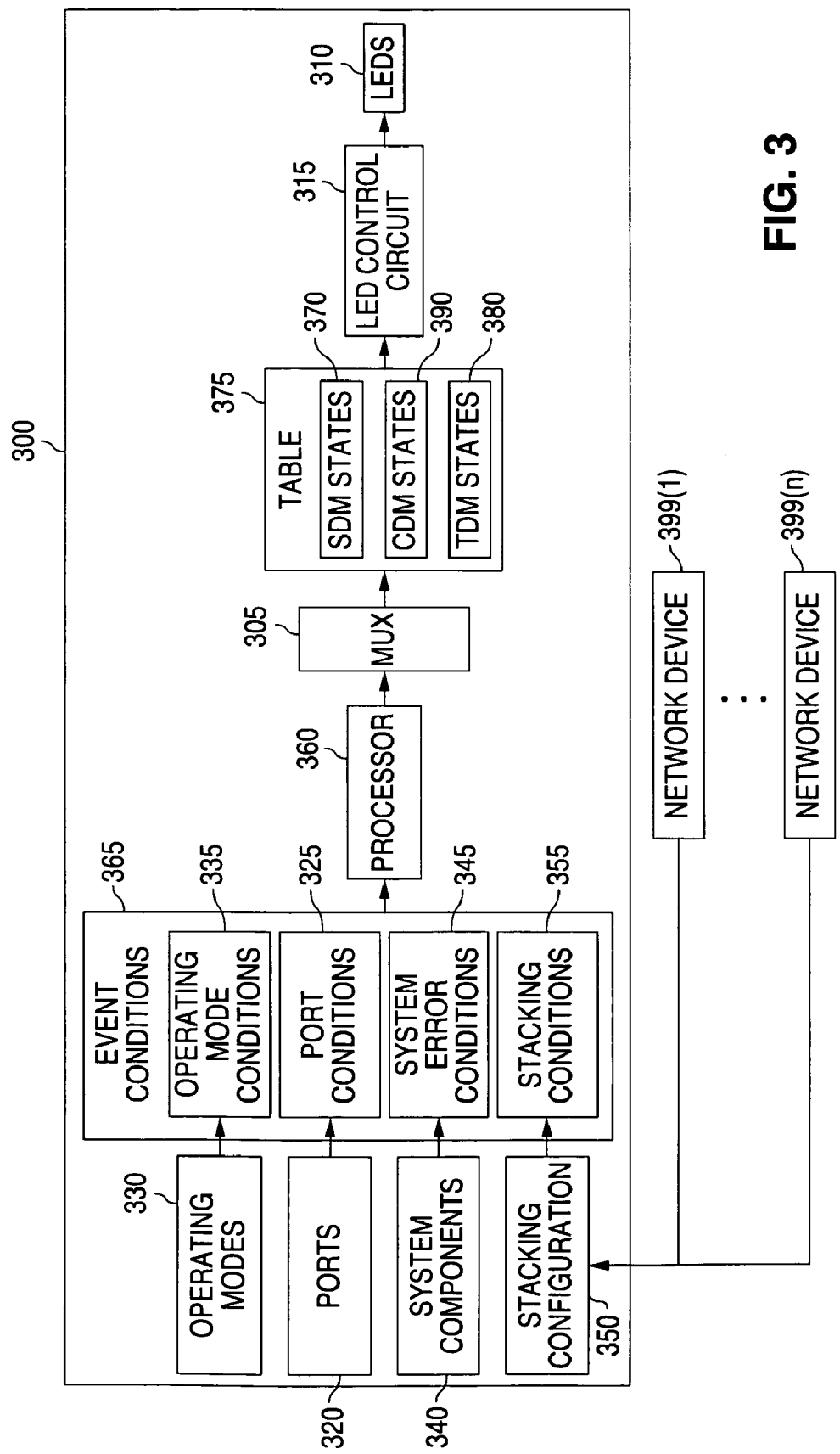
FIG. 3 is a block diagram illustrating a network device connected with additional network devices as part of a network system in accordance with an embodiment of the present invention

FIG. 3 is a block diagram illustrating a network device 300 connected with additional network devices 399 (for example, n additional devices) as part of a network system in accordance with an embodiment of the present invention. Network devices 300 and 399 may be implemented in accordance with any desired type of network equipment, such as switches, routers, and/or other network devices. Although various components of network device 300 are illustrated and are described herein with reference to FIG. 3, it will be appreciated that such components may also be implemented in any of network devices 399 of FIG. 3 or network devices 100 and 200 of FIGS. 1 and 2, respectively.

Network device 300 may be stacked with network devices 399 in accordance with a stacking configuration 350 stored in memory of network device 300. For example, in an embodiment where network devices 300 and 399 are implemented as switches, the stacking of network devices 300 and 399 can provide increased switching capabilities as will be appreciated by those skilled in the art. In such embodiments, stacking configuration 350 may identify stacking IDs of network devices 300 and 399, identify one of network devices 300 and 399 as a master switch, and identify errors which may occur in the identification of network devices 399 stacked with network device 300. It will be appreciated that any desired number of network devices 300 and 399 may be stacked together. For example, in one embodiment, up to six devices may be stacked together.

Network device 300 includes a plurality of ports 320 which may interface with one or more electronic networks including but not limited to: the Internet, intranets, landline networks, wireless networks, and/or other networks known in the art. For example, in one embodiment, ports 320 may be implemented as ports 120 and/or ports 220 of network devices 100 and 200 illustrated in FIGS. 1 and 2, respectively.

Network device 300 may be configured to operate in a plurality of modes 330. For example, in one embodiment, network device 300 may operate in a boot-up mode, a regular operation mode, and an error mode (also referred to herein as a system warning mode and/or a system failure mode). In one embodiment, network device 300 may include one or more additional dedicated LEDs to indicate its current operating mode 330.

In boot-up mode, network device 300 is configured following an initialization from an unpowered or reset state. During boot-up mode, the stacking configuration 350 may be determined and loaded into appropriate memory of network device 300.

Regular operation mode refers to the operating mode of network device 300 in which it performs its assigned networking tasks. For example, if network device 300 is implemented as a switch, then network device 300 may perform appropriate switching operations through ports 320 during regular operation mode as will be understood by those skilled in the art.

Network device 300 may enter error mode in response to the occurrence of one or more predefined warning or failure conditions. Such conditions may include but need not be limited to hardware or software failures of one or more components of network devices 300 or 399.

It will be appreciated that network device 300 may include many additional components to implement networking tasks. For example, in embodiments where network device 300 is implemented as a switch, appropriate network switching hardware and/or software components may be provided as part of network device 300. Such components are illustrated in a general fashion as system components 340 in FIG. 3.

Network device 300 also includes a plurality of status indicators implemented as LEDs 310 which may be configured as multi-function LEDs that display varying types of status information in real time and in response to event conditions detected by network device 300 without requiring user interaction with network device 300. In one embodiment, LEDs 310 may be implemented as LEDs 110 and/or LEDs 210 of network devices 100 and 200 illustrated in FIGS. 1 and 2, respectively. Network device 300 further includes an LED control circuit 315 which may be configured to drive LEDs 310 with appropriate display states as further described herein.

Individual LEDs 310 may be implemented to display status information associated with the networked system of network devices 300 and 399 in response to various event conditions 365 detected by a processor 360 of the network device 300. In this regard, it will be appreciated that ports 320, operating modes 330, system components 340, and stacking configuration 350 may each cause one or more corresponding event conditions 365 to occur which may be detected by a processor 360. It will be appreciated that processor 360 may be implemented with any appropriate circuitry and/or software for detecting event conditions 365.

As illustrated in FIG. 3, event conditions 365 may include port conditions 325, operating mode conditions 335, system error conditions 345, and stacking conditions 355. In this regard, a plurality of port conditions 325 may be detected which correspond to the status of ports 320. For example, a "linked" port status may indicate that data communication is successfully provided through a given port 320. Conversely, a "shorted" status may indicate that data communication through a given port 320 is unsuccessful.

A plurality of mode conditions 335 may also be detected which correspond to the particular operating mode of network device 300. For example, the boot-up mode, regular operation mode, or error mode of network device 300 may be detected.

A plurality of system error conditions 345 may also be detected which correspond to warnings or failures associated with system components 340 of network device 300. For example, in one embodiment, different system error conditions 345 may be detected for the failure of various hardware or software of network device 300.

A plurality of stacking conditions 355 may also be detected which correspond to particular information provided by stacking configuration 350. For example, in one embodiment, different stacking conditions 355 may be detected which identify stacking IDs of network devices 300 and 399, identify which of network devices 300 and 399 is designated as the master switch, or identify errors which may occur in the identification of network devices 399 stacked with network device 300.

Processor 360 provides the detected error conditions 365 to a multiplexer 305 which may be used to select appropriate status information from a table 375 using various associations stored in the table 375 as further described herein. It will be appreciated that multiplexer 305 and table 375 together provide a logic circuit that may select particular status information for display by LEDs 310 in response to event conditions 365 detected by processor 360. As further described herein, status information selected from table 375 may be provided to LED control circuit 315 which may drive LEDs 310 to display the status information.

Each of LEDs 310 may be positioned on a panel of network device 300 in accordance with a plurality of physical positions similar to LEDs 110 and 210 of FIGS. 1 and 2, respectively. The positions of LEDs 310 may correspond to a space-division multiplexing (SDM) implementation wherein each one of LEDs 310 is associated with particular aspects of network devices 300 and 399 and event conditions 365 based on the physical position of the LED 310 on the front panel of the network device 300. For example, Table 1 below illustrates one embodiment of various associations implemented in accordance with particular SDM states:

TABLE 1

| SDM States | 1-6 | 7-48 |
|---|---|---|
| Port IDs | 1-6 | 7-48 |
| Stacking IDs | 1-6 | Not valid |
| Warning/Failure Case IDs | 1-6 | 7-48 |

In the example of Table 1, network device 300 has been implemented with 48 LEDs 310, 48 ports 320, and may be stacked together with five additional network devices 300 for a total of six stacked devices. As set forth in Table 1, the 48 SDM states 370 may associate each of LEDs 310 with particular port IDs of individual ports 320, stacking IDs of network devices 300/399, and/or warning/failure case IDs corresponding to warnings or failures (i.e., error conditions) of particular system components 340.

Specifically, six of the LEDs 310 (i.e., LEDs in positions 1-6 on network device 300) are each associated with a corresponding one of port IDs 1-6, stacking IDs 1-6, and warning/failure case IDs 1-6. Similarly, the remaining LEDs 310 (i.e., LEDs in positions 7-48 on network device 300) are each associated with a corresponding one of port IDs 1-6 and warning/failure case IDs 1-6. It will be appreciated that because only six network devices 300 are contemplated to be stacked together in the embodiment of Table 1, LEDs 310 in positions 7-48 are not associated with any stacking IDs.

The particular type of status information displayed by LEDs 310 can change in real time in response to different operating mode conditions 335 of network device 300 in accordance with a time-division multiplexing (TDM) implementation. In such a TDM implementation, each of the operating modes 330 is associated with particular aspects of network devices 300 and 399. For example, Table 2 below illustrates one embodiment of various associations implemented in accordance with particular TDM states:

TABLE 2

| TDM States | Boot-up | Regular Operation | System Warning/Failure |
|---|---|---|---|
| Port IDs | Not valid | 1-48 | Not valid |
| Stacking IDs | 1-6 | Not valid | Not valid |
| Warning/Failure Case IDs | Not valid | Not valid | 1-48 |

In the example of Table 2, network device 300 has been implemented with 48 LEDs 310, three operating modes 330, 48 ports IDs, and 48 possible warning/failure case IDs. Three TDM states may associate each of operating modes 330 with particular port IDs, stacking IDs, and/or warning/failure case IDs.

As set forth in Table 2, when network device 300 is operating in boot-up mode, LEDs 310 (i.e., LEDs in positions 1-6 on network device 300) are each associated with corresponding stacking IDs 1-6. When network device 300 is operating in regular operation mode, LEDs 310 (i.e., LEDs in positions 1-48 on network device 300) are each associated with port IDs 1-48. When network device 300 is operating in an error mode, LEDs 310 (i.e., LEDs in positions 1-48 on network device 300) are each associated with a corresponding one of warning/failure case IDs 1-48.

LEDs 310 may be implemented to exhibit a plurality of display states in order to display status information of network device 300. For example, in one embodiment, LEDs 310 may be configured to exhibit various colors corresponding to different display states in accordance with a color-division multiplexing (CDM) implementation. In such a CDM implementation, each of the display states are associated with particular aspects of network devices 300 and 399. For example, Table 3 below illustrates one embodiment of various associations implemented in accordance with particular CDM states:

TABLE 3

| CDM States | Green | Green Blinking | Yellow | Yellow Blinking | Red | Red Blinking |
|---|---|---|---|---|---|---|
| Boot-up | Not valid | 1-6 for stacking ID | Not valid | Not valid | Not valid | 1-6 for stacking error |
| Regular Operation | 1-48 for linked | Not valid | 1-48 for short linked | Not valid | Not valid | Not valid |
| System Warning/Failure | Not valid | Not valid | Not valid | 1-48 for warning IDs | 1-48 for failure IDs | Not valid |

In the example of Table 3, network device 300 has been implemented with 48 LEDs 310, three operating modes 330, 48 ports 320, 48 possible warning IDs, and 48 possible failure IDs. It will be appreciated that the 48 warning/failure case IDs of Tables 1 and 2 are further differentiated into warning and failures in the embodiment of Table 3. Six CDM states are provided wherein each one of LEDs 310 may exhibit a green display state, a green blinking display state, a yellow display state, a yellow blinking display state, a red display state, or a red blinking display state. The various display states are associated with various operating mode conditions 335, stacking conditions 355, port conditions 325, and system error conditions 345. It will be appreciated that the display states set forth in Table 3 are provided for the purposes of example only, and that other associations or display states may be provided instead of or in addition to the above-identified display states.

As set forth in Table 3, individual LEDs 310 may exhibit a green blinking display state to identify the stacking IDs of network devices 300 and 399 while network device 300 is in boot-up mode. However, if a stacking error is detected during boot-up mode, one or more of LEDs 310 may exhibit a red blinking display state to identify the network devices 300 and 399 exhibiting a stacking error.

While network device 300 is in regular operation mode, LEDs 310 may exhibit a green display state to indicate that data communication is successful over ports 320 associated with the LEDs 310. However, if data communication is unsuccessful over one or more of ports 320, corresponding LEDs 310 will exhibit a yellow blinking display state.

While network device 300 is in an error mode, LEDs 310 corresponding to particular warning conditions will exhibit a yellow display state. Also in error mode, LEDs 310 corresponding to particular failure conditions will exhibit a red display state.

In one embodiment, status information may be displayed by LEDs 300 in accordance with the following priorities: (1) system warning/failure information; (2) boot-up information; and (3) regular operation information. For example, if a system error condition is detected while network device 300 is operating in regular operating mode, the status information displayed by LEDs 300 may shift from displaying port-related information (i.e., using green and yellow display states) to displaying system warning/failure information (i.e., using yellow blinking and red display states).

It will be appreciated that the various SDM, TDM, and CDM states set forth in Tables 1-3 provide associations between particular event conditions 365, LEDs 310, and display states of the LEDs 310. For example, it will be appreciated that while network device 300 is operating in boot-up mode, LEDs 310 1-6 may be used to indicate the stacking IDs of network devices 300 and 399 using a green blinking display state. LEDs 310 1-6 may also be used to indicate one or more stacking errors associated with particular network devices 300 and 399 using a red blinking display state. Similarly, while network device 300 is operating in regular operation mode, LEDs 310 1-48 may be used to indicate whether each of the 48 ports 320 is operating correctly by exhibiting a green display state to indicate a linked status, and a yellow display state to indicate a shorted status. While network device 300 is operating in an error mode, LEDs 310 1-48 may be used to indicate particular warning conditions or failure conditions by exhibiting a yellow blinking or red display state for one or more of LEDs 310 which are associated with a particular error condition detected at network device 300.

As illustrated in FIG. 3, the various associations of Tables 1, 2, and 3 may be stored as SDM states 370, TDM states 380, and CDM states 390 in a memory, such as a table 375, of network device 300. In one embodiment, table 375 may be implemented by a programmable gate array or other non-volatile memory device. Status information selected from table 375 for display by LEDs 310 may be provided to LED control circuit 315 which may drive LEDs 310 with the various display states set forth in Table 3 above in accordance with the status information. The manner in which event conditions 365 and the various associations stored in table 375 are used to provide and display status information on LEDs 310 may be further understood in view of the processes of FIGS. 4 and 5 further described herein.

Figure 4:
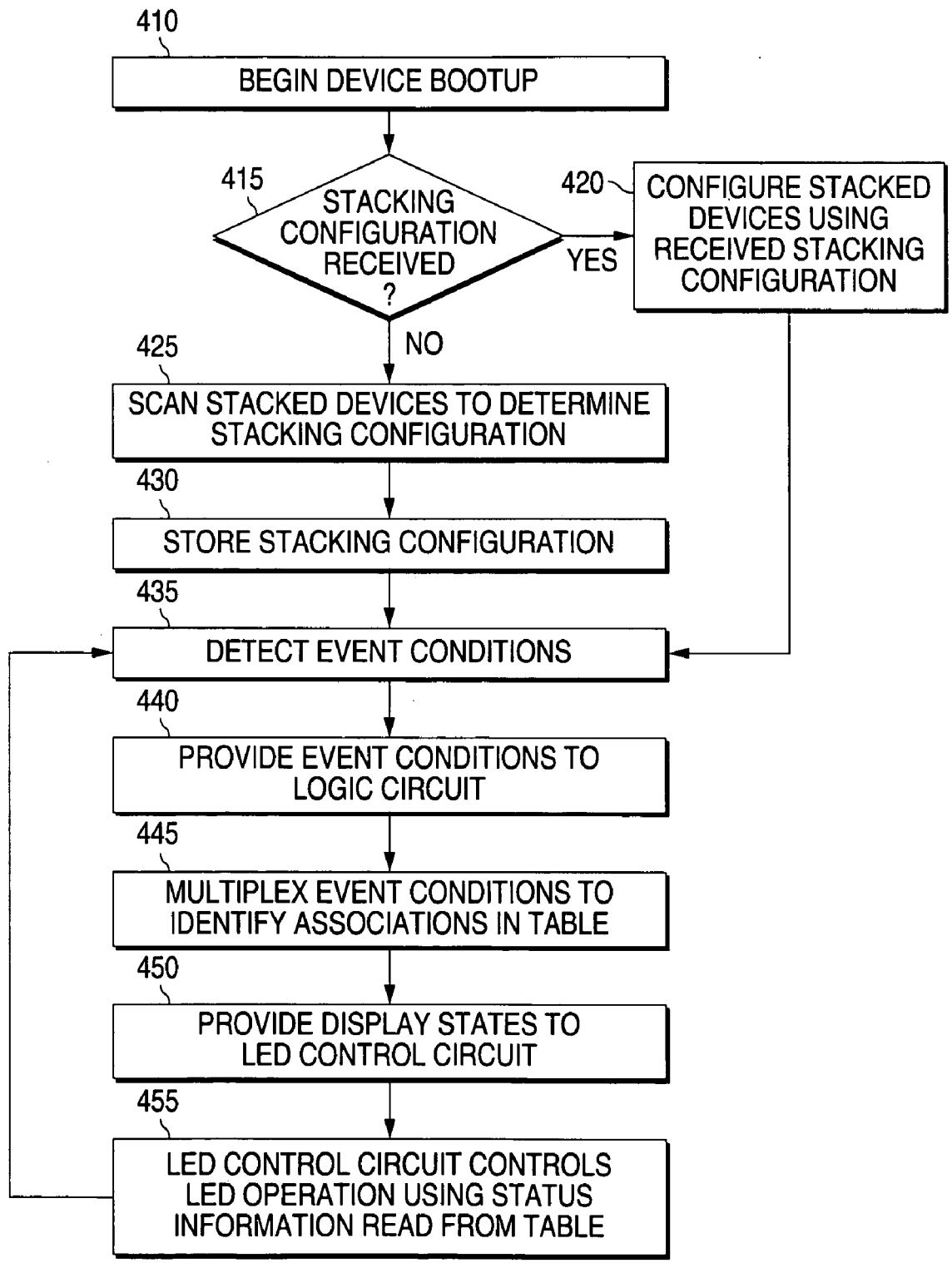
FIG. 4 is a flowchart illustrating a process for providing status information to status indicators of a network device in accordance with an embodiment of the present invention.

FIG. 4 is a flowchart illustrating a process for providing status information to LEDs 310 of network device 300 in accordance with an embodiment of the present invention. In step 410, network device 300 is initialized from an unpowered or reset state and enters boot-up mode during which stacking configuration 350 is determined and loaded into appropriate memory of network device 300. In step 415, network device 300 waits to receive the stacking configuration 350 from one of network devices 399 and/or over ports 320. As previously described, stacking configuration 350 may identify one or more additional network devices 399 which to be operated with network device 300 in a stacked configuration. In this regard, stacking configuration 350 may include stacking IDs which identify network devices 399, and may further identify which of network devices 300 and 399 will operate as a master switch of the stack.

If a stacking configuration 350 is received, then the stack of network devices 300 and 399 will configured in accordance with the stacking IDs and the master switch identifier provided by the stacking configuration 350 (step 420), and the process continues to step 435. However, if no stacking configuration 350 is received, then the process continues to step 425. In step 425, network device 300 scans network devices 399 to determine the stacking configuration 350. In one embodiment, network device 300 may be configured to use the lowest available non-master stacking ID. Network device 300 then stores the stacking configuration 350 in memory (step 430).

In step 435, processor 360 detects event conditions 365 at network device 300. As previously described, event conditions 365 may include port conditions 325, mode conditions 335, system error conditions 345, and stacking conditions 355. However, it will be appreciated that any appropriate conditions may be detected by processor 360 in various embodiments.

In step 440, the detected event conditions 365 are provided to the logic circuit implemented by multiplexer 305 and table 375. The event conditions 365 are multiplexed to identify associations stored by states 370, 380, and 390 in table 375 which correspond to status information to be displayed by LEDs 310 (step 445).

The corresponding display state for each of LEDs 310 is provided to LED control circuit 315 (step 450) which then drives LEDs 310 with the display state corresponding to the status information to be displayed (step 455). The process then returns to step 435 where additional event conditions 365 may be detected which may be used in steps 440-455 for displaying additional status information in response to changes in event conditions 365. In this regard, it will be appreciated that the status information displayed by LEDs 310 may change in response to the event conditions 365 detected by processor 360 without requiring user interaction with network device 300.

Figure 5:
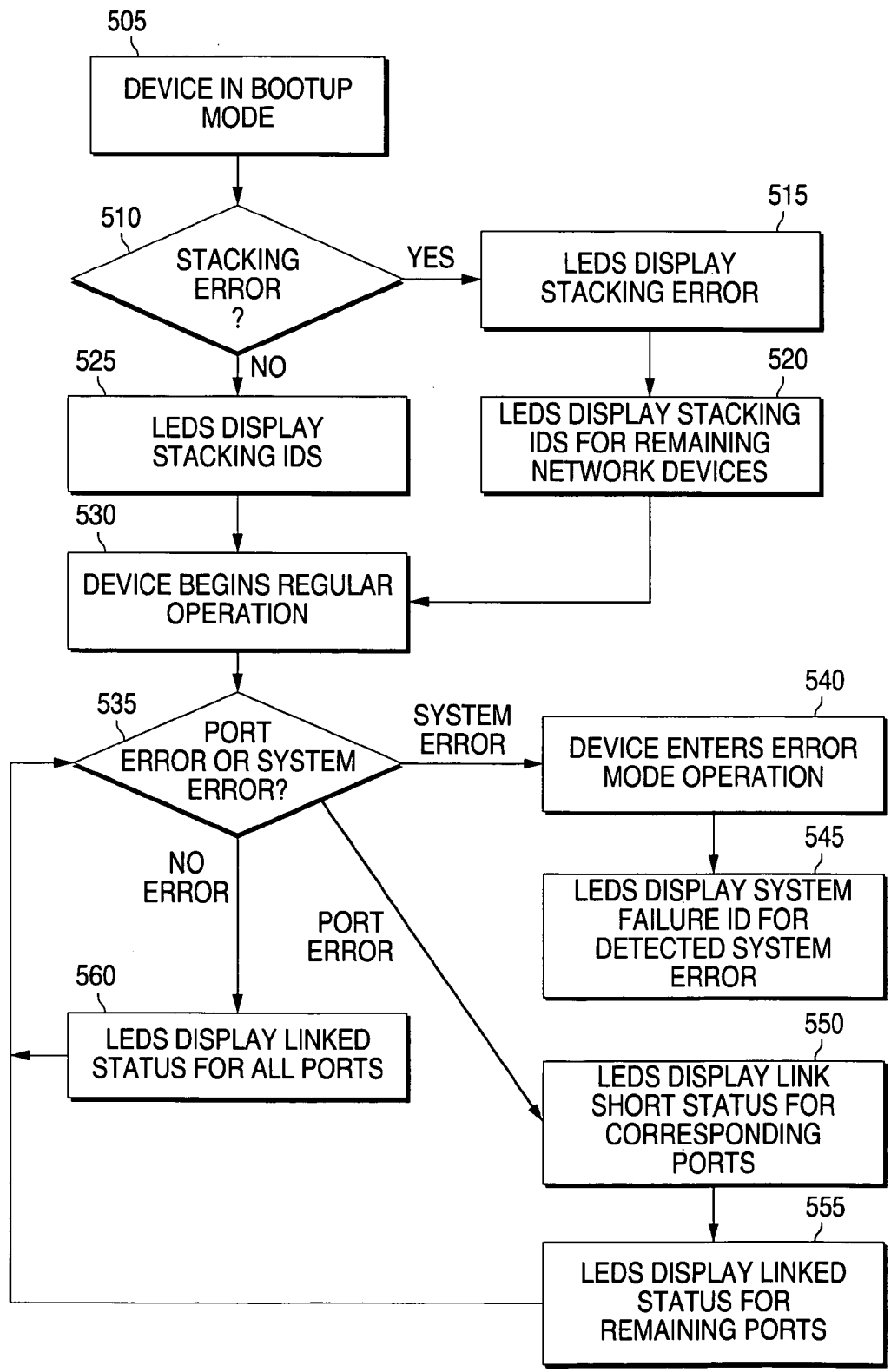
FIG. 5 is a flowchart illustrating a process for displaying status information on status indicators of a network device in accordance with an embodiment of the present invention.

FIG. 5 is a flowchart illustrating a process for displaying status information on LEDs 310 of network device 300 in accordance with an embodiment of the present invention. It will be appreciated that the process of FIG. 5 demonstrates the display of various status information by LEDs 310 while network device 300 performs the previously-described process of FIG. 4. In step 505, network device 300 is operating in boot-up mode. As previously described, network device 300 may enter boot-up mode in response to an initialization from an unpowered or reset state. While in boot-up mode, processor 360 operates to detect event conditions 365 as described. If an error in stacking configuration 350 is detected (step 510), then LEDs 310 may display appropriate status information concerning the stacking error (step 515) and display normal operation for the remaining network devices (step 520). However, if no stacking error event condition is detected for a particular one of network devices 300 and 399, then stacking IDs can be displayed by LEDs 310 (step 525).

As previously described in the embodiments of Tables 1-3 above, six of LEDs 310 may be associated with particular stacking IDs of network devices 300 and 399. Accordingly, a stacking error associated with network device 300 may be displayed by a first one of LEDs 310 exhibiting a red blinking display state, while a stacking error associated with network device 399(1) may be displayed by a second one of LEDs 310 also exhibiting a red blinking display state. If no stacking error is associated with network device 399(2), then a third one of LEDs 310 may exhibit a green blinking display state to indicate that network device 399(2) is properly configured as part of the stack.

In step 530, network device 300 enters regular operation mode during which processor 360 continues to detect event conditions 365 (step 535). If no port errors or system errors are detected, then LEDs 310 will display appropriate status information to indicate that all of ports 320 are operating correctly (step 560). In view of Tables 1-3 above, it will be appreciated that this may be indicated by 48 of LEDs 310 exhibiting a green display state, with each LED 310 indicating a linked status for an associated one of ports 320.

During step 535, if a system error is detected (for example, a condition associated with one of 48 possible warning IDs or failure IDs), then network device 300 enters an error mode of operation (step 540). As a result, in step 545, LEDs 310 may display appropriate status information to indicate particular warning conditions or failure conditions by exhibiting a yellow blinking or red display state for one or more of LEDs 310 which are associated with a particular error condition detected in step 535.

During step 535, if an error is detected at one of ports 320 (for example, a shorted condition), then LEDs 310 may display appropriate status information to indicate a shorted status for the associated ports 320 (step 550). It will be appreciated that this may be indicated by any of the 48 LEDs 310 associated with the affected port exhibiting a yellow display state as described in Tables 1-3 above. A linked status may be indicated for the remaining ports 320 (step 555) using a green display state also set forth in Tables 1-3.

In view of the present disclosure, it will be appreciated that various features set forth herein provide significant improvements to the monitoring of status information relevant to the performance of network devices. Multi-function status indicators in accordance with the various embodiments disclosed herein can provide users with relevant information concerning the status of stacking configurations, ports, system errors, and other information relevant to the operation of a network device without requiring users to physically interact with the device. Advantageously, the status information displayed by the status indicators can change in response to various event conditions detected at the network device. As a result, large amounts of context-sensitive information can be displayed using a limited number of status indicators, thereby permitting valuable panel real estate to be used for network connections or other purposes.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into substeps to provide features described herein.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure.

Having thus described embodiments of the present invention, persons of ordinary skill in the art will recognize that changes may be made in form and detail without departing from the scope of the invention. Thus the invention is limited only by the following claims.

What is claimed is:

1. A method of displaying status information associated with a network device, the method comprising:
   detecting a first event condition at the network device;
   selecting a first type of status information corresponding to the first detected event condition, wherein the first type of status information is to be displayed on each one of a plurality of user-viewable, multi-function status indicators in response to the first detected event condition;
   associating a first plurality of display states of the multi-function status indicators with the first type of status information;
   exhibiting a display state of the first plurality of display states on one or more of the multi-function status indicators to indicate the first type of status information on each of the multi-function status indicators in response to the first event condition detected at the network device;
   detecting a second different event condition at the network device;
   selecting a second different type of status information corresponding to the second detected event condition, wherein the second different type of status information is to be displayed on each of the multi-function status indicators in response to the second detected event condition;
   associating a second different plurality of display states of the multi-function status indicators with the second type of status information; and
   without requiring user interaction with the network device, switching from displaying the first type of status information on each one of the multi-function status indicators to displaying the second type of status information on each one of the multi-function status indicators by exhibiting a display state of the second plurality of display states on one or more of the multi-function status indicators to indicate the second type of status information on each of the multi-function status indicators in response to the second event condition detected at the network device.

2. The method of claim 1, further comprising associating each of the status indicators with at least one of a plurality of ports of the network device, at least one of a plurality of stacking IDs, and at least one of a plurality of error conditions, wherein the display state of each status indicator is dependent on the port, the stacking ID, and the error condition associated with the status indicator.

3. The method of claim 2, wherein the first event condition is one of the following types of event conditions and the second event condition is a different one of the following types of event conditions:
one of a plurality of operating modes of the network device;
one of a plurality of port conditions;
one of the error conditions; and
one of a plurality of stacking conditions.

4. The method of claim 3, further comprising:
associating the operating modes of the network device with the ports, the stacking IDs, and the error conditions;
wherein the associating the first plurality of display states comprises associating the first plurality of display states with at least a first one of the operating modes, the stacking conditions, the port conditions, and the error conditions;
wherein the associating the second plurality of display states comprises associating the second plurality of display states with at least a second one of the operating modes, the stacking conditions, the port conditions, and the error conditions; and
maintaining the associations of the status indicators, the operating modes, and the display states in a memory of the network device.

5. The method of claim 4, further comprising:
detecting a third different event condition at the network device before the first determining operation;
multiplexing the first and third event conditions to identify at least one of the associations in the memory; and
reading the first type of status information from the identified association.

6. The method of claim 1, wherein the status indicators are light emitting diodes (LEDs).

7. A network device comprising:
a plurality of user-viewable, multi-function status indicators adapted to display status information associated with the network device;
a processor adapted to detect a first event condition at the network device and a second different event condition at the network device;
a logic circuit adapted to:
select a first type of status information corresponding to the first detected event condition and a second different type of status information corresponding to the second detected event condition, wherein the first type of status information and the second different type of status information are to be displayed on each one of the plurality of multi-function status indicators in response to the first and second event conditions, respectively, and
associate a first plurality of display states of the multi-function status indicators with the first type of status information and a second different plurality of display states of the multi-function status indicators with the second type of status information; and
a control circuit adapted to switch, without requiring user interaction with the network device, from providing the multi-function status indicators with the first plurality of display states associated with the first type of status information so that one or more of the multi-function status indicators exhibits a display state indicating the first type of status information to providing the multi-function status indicators with the second plurality of display states associated with the second type of status information so that one or more of the multi-function status indicators exhibits a display state indicating the second type of status information.

8. The network device of claim 7, further comprising:
a plurality of ports;
a stacking configuration comprising a plurality of stacking IDs; and
a memory adapted to store associations between each of the status indicators and at least one of the ports, at least one of the stacking IDs, and at least one of a plurality of error conditions, wherein the display state provided to each status indicator is dependent on the port, the stacking ID, and the error condition associated with the status indicator.

9. The network device of claim 8, wherein the first event condition is one of the following types of event conditions and the second event condition is a different one of the following types of event conditions:
one of a plurality of operating modes of the network device;
one of a plurality of port conditions;
one of the error conditions; and
one of a plurality of stacking conditions.

10. The network device of claim 9, wherein the memory is further adapted to store:
associations between each of the operating modes of the network device and the ports, the stacking IDs, and the error conditions;
associations between the first plurality of display states and the first type of status information, wherein the first type of status information is at least a first one of the operating modes, the stacking conditions, the port conditions, and the error conditions; and
associations between the second plurality of display states and the first type of status information, wherein the first type of status information is at least a second one of the operating modes, the stacking conditions, the port conditions, and the error conditions.

11. The network device of claim 10, wherein:
the processor is further adapted to detect a third event condition at the network device; and
the logic circuit is further adapted to multiplex the event conditions to identify at least one of the associations in the memory and read the first type of status information from the identified association.

12. The network device of claim 7, wherein the status indicators are light emitting diodes (LEDs).

13. The network device of claim 7, wherein the network device is a switch.

14. The network device of claim 7, wherein the network device is a router.

15. A network device comprising
means for detecting a first event condition at the network device and for detecting a second different event condition at the network device;
means for selecting a first type of status information corresponding to the first detected event condition and a second different type of status information corresponding to the second detected event condition, wherein the first type of status information is to be displayed in response to the first detected event condition and the second different type of status information is to be displayed in response to the second type of detected event condition;
means for associating a first plurality of display states of the multi-function status indicators with the first type of status information and a second different plurality of display states of the multi-function status indicators with the second type of status information;

means for displaying the first type of status information by exhibiting the first plurality of display states and for displaying the second type of status information by exhibiting the second different plurality of display states, wherein the means for displaying the first and second types of status information is multi-functional, displaying both the first and second plurality of display states; and means for switching from displaying the first type of status information on the multi-functional displaying means to displaying the second type of status information on the multi-functional displaying means without requiring user interaction with the network device.

16. The network device of claim 15, further comprising means for associating the displaying means with at least one of a plurality of ports of the network device, at least one of a plurality of stacking IDs, and at least one of a plurality of error conditions, wherein the display state of the displaying means is dependent on the port, the stacking ID, and the error condition associated with the displaying means.

17. The network device of claim 16, wherein the first event condition is one of the following types of event conditions and the second event condition is a different one of the following types of event conditions:

one of a plurality of operating modes of the network device;

one of a plurality of port conditions;

one of the error conditions; and one of a plurality of stacking conditions.

18. The network device of claim 17, further comprising:

means for associating the operating modes of the network device with the ports, the stacking IDs, and the error conditions;

wherein the means for associating the display states comprises:

means for associating the first plurality of display states with at least a first one of the operating modes, the stacking conditions, the port conditions, and the error conditions, and means for associating the second plurality of display states with at least a second one of the operating modes, the stacking conditions, the port conditions, and the error conditions; and means for maintaining the associations of the displaying means, the operating modes, and the display states.

19. The network device of claim 18, wherein the means for detecting further comprises means for detecting a third different event condition at the network device, the network device further comprising:

means for multiplexing the first and third event conditions to identify at least one of the associations in the maintaining means; and means for reading the first type of status information from the identified association.

20. The network device of claim 15, wherein the displaying means is a plurality of light emitting diodes (LEDs).

* * * * *